United States Patent
Stenger (10) Patent No.: US 7,471,334 B1
(45) Date of Patent: Dec. 30, 2008

(54) WILDLIFE-SENSING DIGITAL CAMERA WITH INSTANT-ON CAPABILITY AND PICTURE MANAGEMENT SOFTWARE

(76) Inventor: Thomas A. Stenger, 2309 Evenson Dr., Onalaska, WI (US) 54650

(*) Notice: Subject to any disclaimer, the term of this patent is extended or adjusted under 35 U.S.C. 154(b) by 656 days.

(21) Appl. No.: 10/994,765

(22) Filed: Nov. 22, 2004

(51) Int. Cl.
H04N 5/225 (2006.01)
H04N 7/18 (2006.01)
G03B 17/00 (2006.01)

(52) U.S. Cl. .................. 348/373; 348/155; 348/143; 396/427

(58) Field of Classification Search .......... 348/152, 348/154, 81; 396/27, 25, 427, 433
See application file for complete search history.

(56) References Cited

U.S. PATENT DOCUMENTS

| 5,610,654 | A | 3/1997 | Parulski et al. |
| 5,742,340 | A | 4/1998 | Alves |
| 6,449,431 | B1* | 9/2002 | Cuddeback et al. ........... 396/27 |
| 6,621,519 | B2 | 9/2003 | Nakayama et al. |
| 6,834,162 | B1* | 12/2004 | Schnell ...................... 396/153 |
| 2002/0027601 | A1 | 3/2002 | Nakayama et al. |
| 2002/0159770 | A1* | 10/2002 | Moultrie ...................... 396/265 |
| 2005/0212912 | A1* | 9/2005 | Huster ......................... 348/155 |

OTHER PUBLICATIONS

Nature Vision; Game-Vu; URL http://www.gamevu.com; Website Pages Published on Oct. 11, 2002 per Wayback-Machine.org.
Trail Sense Engineering, LLC; URL http://www.trailsenseseeengineering.com; Pages Published on Nov. 3, 2001 Per Waybackingmachine.org.
Cuddeback; URL http://www.cuddebackdigital.com Website Pages Published on Feb. 8, 2004 Per Waybackmachine.org.

* cited by examiner

Primary Examiner—Luong T Nguyen
(74) Attorney, Agent, or Firm—Robert J. Harter (57) ABSTRACT

An outdoor, battery powered digital camera includes a passive infrared motion detector that allows the camera to be left unattended, as the detector automatically triggers the camera to take a picture upon sensing the presence of a moving animal. To prolong the life of the battery, the camera goes into a power-saving sleep mode between pictures. To enable the camera to instantly take a picture upon suddenly being awakened by the motion detector, the exposure setting of the camera is periodically checked, adjusted and stored so that the camera can use that fairly recent exposure setting, or one near it, to take an instant picture rather than wasting excessive time adjusting the exposure when the animal first appears. In some cases, the camera is used in conjunction with picture management software.

6 Claims, 10 Drawing Sheets

WILDLIFE-SENSING DIGITAL CAMERA WITH INSTANT-ON CAPABILITY AND PICTURE MANAGEMENT SOFTWARE

BACKGROUND OF THE INVENTION

1. Field of the Invention

The subject invention generally pertains to motion sensing digital cameras for monitoring and photographing wildlife and more specifically pertains to such a camera that includes a sleep mode for conserving the camera's battery life between shots.

2. Description of Related Art

There are a wide variety of cameras for various uses. Wildlife observation cameras, however, are particularly unique for all their special needs. Typical wildlife cameras are usually left unattended in an area where wildlife is expected, and a motion detector is often used for triggering the camera when an animal appears. Some of the unique needs of wildlife cameras include a motion detector or some other camera-triggering device; weather protection; an illuminating flash for taking pictures at night; rapid response for taking pictures of fast animals; and logic for adjusting the camera's function under changing conditions such as amount of daylight, outdoor temperature, size of animal, and speed of animal.

A particularly important feature of a wildlife camera is its battery life. Such cameras are usually set up in the woods or other remote areas where outside electrical power is unavailable. Since such cameras may be expected to run continuously on their own for hours, overnight, or even several days, the camera's battery may need to be quite large and bulky. Conceivably, a camera could be put in a sleep mode to conserve energy between shots; however, the process of "waking" a digital camera typically involves setting its gain (AGC or automatic gain control), which can take a moment before a picture can be taken. Even a few milliseconds, unfortunately, can mean the difference between capturing and missing a shot of a fast moving animal, such as a bird in flight.

Some cameras, as disclosed in U.S. Pat. No. 6,621,519, the current white balance is adjusted on the basis of previously stored data. Unlike the automatic gain control of a black and white camera, however, white balance pertains to color adjustment. A picture, for example, taken of a room with yellow walls and nothing white in the room to serve as a white reference may result in picture with a maladjusted white balance, whereby a photograph of the walls may appear white rather than yellow.

Other cameras of interest are disclosed in U.S. Pat. Nos. 5,742,340 and 5,610,654. The '340 patent discloses a camera with an ambient light sensor, whereby the camera does not require high speed automatic gain control responses when objects move rapidly across the camera's field-of-view. The '654 patent discloses a camera that uses a Flash EPROM memory card, whereby images on the card can be downloaded to a computer or a printing device.

SUMMARY OF THE INVENTION

To provide a better wildlife observation camera, it is an object of some embodiments of the invention to provide a digital camera with an instant-on feature that allows the camera to almost instantly take a picture upon awakening from a reduced-power sleep mode.

Another object of some embodiments is to periodically adjust the exposure of a digital camera and store its exposure setting at that time for instant reference later, whereby a later picture can be taken instantly without having to spend excessive time adjusting the camera's exposure setting.

Another object of some embodiments is to take a first and second picture in rapid succession, wherein the second picture is based on an exposure setting determined just before taking the second picture, and the first picture is based on an exposure setting that was the result of adjusting an earlier setting, which was determined and stored much earlier.

Another object of some embodiments is to selectively enable and disable a digital camera by covering or uncovering the camera's optical subject detector, whereby the camera can be effectively turned on and off without penetrating the camera's weather-resistant case.

Another object of some embodiments is to provide a digital camera with a near-video feature by triggering the camera to take pictures in rapid succession.

Another object of some embodiments is to periodically adjust or check the exposure of a digital camera even throughout the night. When checking the exposure at night, however, the illuminator is not always used, as the desired exposure can be assumed to be the same as the last time the illuminator was used in the dark. Thus, reduced use of the illuminator prolongs the camera's battery life.

Another object of some embodiments is to minimize power consumption during a camera's sleep mode by providing the camera with an additional microcontroller chip, wherein the overall power consumption of the camera is less with the additional chip than if that chip were eliminated and its function had been incorporated into the other existing chips.

Another object of some embodiments is to provide a camera with a portable memory device that can be selectively attached to the camera and a computer and manually carried therebetween for not only transferring digital pictures from the camera to the computer but also for transferring user-adjustable parameters from the computer to the camera, wherein the user-adjustable parameters adjust picture characteristics such as sharpness, contrast, and brightness.

Another object of some embodiments is to provide a system for organizing and managing the pictures taken by a digital camera, wherein the method involves enabling a user to display a personally chosen map, graph, chart, spreadsheet, table, image, picture, etc. on a computer monitor and then place markers (visible or invisible) on that chosen image. The user then creates associations between those markers and selected sets of pictures so that upon subsequently mouse-clicking on a marker, the user is able to quickly access the pictures that have been associated with that marker.

Another object of some embodiments is to adjust the exposure of a digital camera using an iterative process that may involve noting the camera's exposure setting, scanning an image, evaluating the results, adjusting the exposure to a new setting if necessary, scanning a second image at the new exposure setting, evaluating the results, adjusting the exposure to yet another new setting if necessary, scanning a third image, evaluating the results, and continuing in this manner until the resulting image is within a predetermined acceptable range.

One or more of these and/or other objects are provided by the subject invention.

DESCRIPTION OF THE PREFERRED EMBODIMENT

Figure 1:
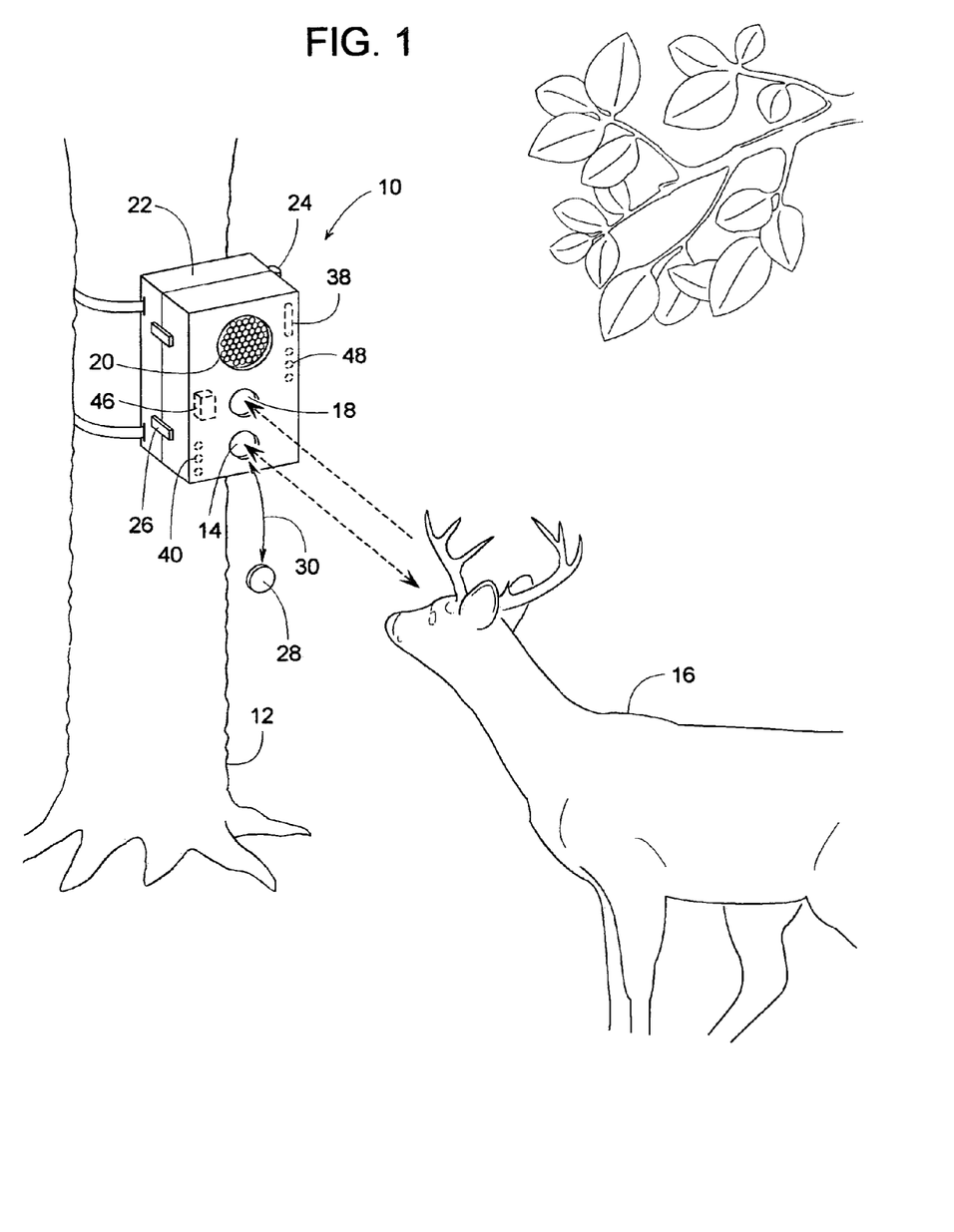
FIG. 1 is a perspective view a wildlife sensing digital camera in use.

A camera 10, shown strapped to a tree 12 in FIG. 1, includes several features that make it particularly suited for observing and capturing pictures of wildlife. Although camera 10 is preferably a digital camera, in some embodiments of the invention, camera 10 could be a 35 mm or some other type of non-digital camera.

A subject detector 14 allows the camera to be left unattended, as detector 14 automatically triggers the camera to take a picture of a subject 16 (e.g., an animal) upon sensing the subject's presence. Detector 14 represents any device (optical or otherwise) that can sense and react to the presence of subject 16. An example of detector 14 includes, but is not limited to, a conventional passive infrared detector (PIR detector) that responds to changes in heat radiated from subject 16.

A conventional lens 18 focuses an image of subject 16 into the camera. To take pictures at night, camera 10 includes an illuminator 20, such as, for example, a bank of infrared light emitting diodes that can be momentarily energized to illuminate subject 16 as its picture is being taken.

For outdoor use, the camera's electrical circuit is enclosed within a weather-resistant case 22. To access the electrical circuit, a hinge 24 and a set of latches 26 enable case 22 to be opened. The term, "weather-resistant" does not necessarily refer to a case that is hermetically sealed or waterproof but rather describes a case that can substantially shield its interior or its contents from normal precipitation.

To effectively turn the camera off without having to open case 22 or equip camera 10 with an external weather-resistant on/off switch, an external cover 28, such as a cap, can be manually moved (arrow 30) to selectively cover or uncover a viewing window of detector 14, thereby selectively disabling the detector. This, of course, only works in cases where detector 14 is some type of optical device. Cover 28 can reduce the frequency of opening case 22 and thus minimize the outside exposure of the camera's electrical circuit.

Figure 2:
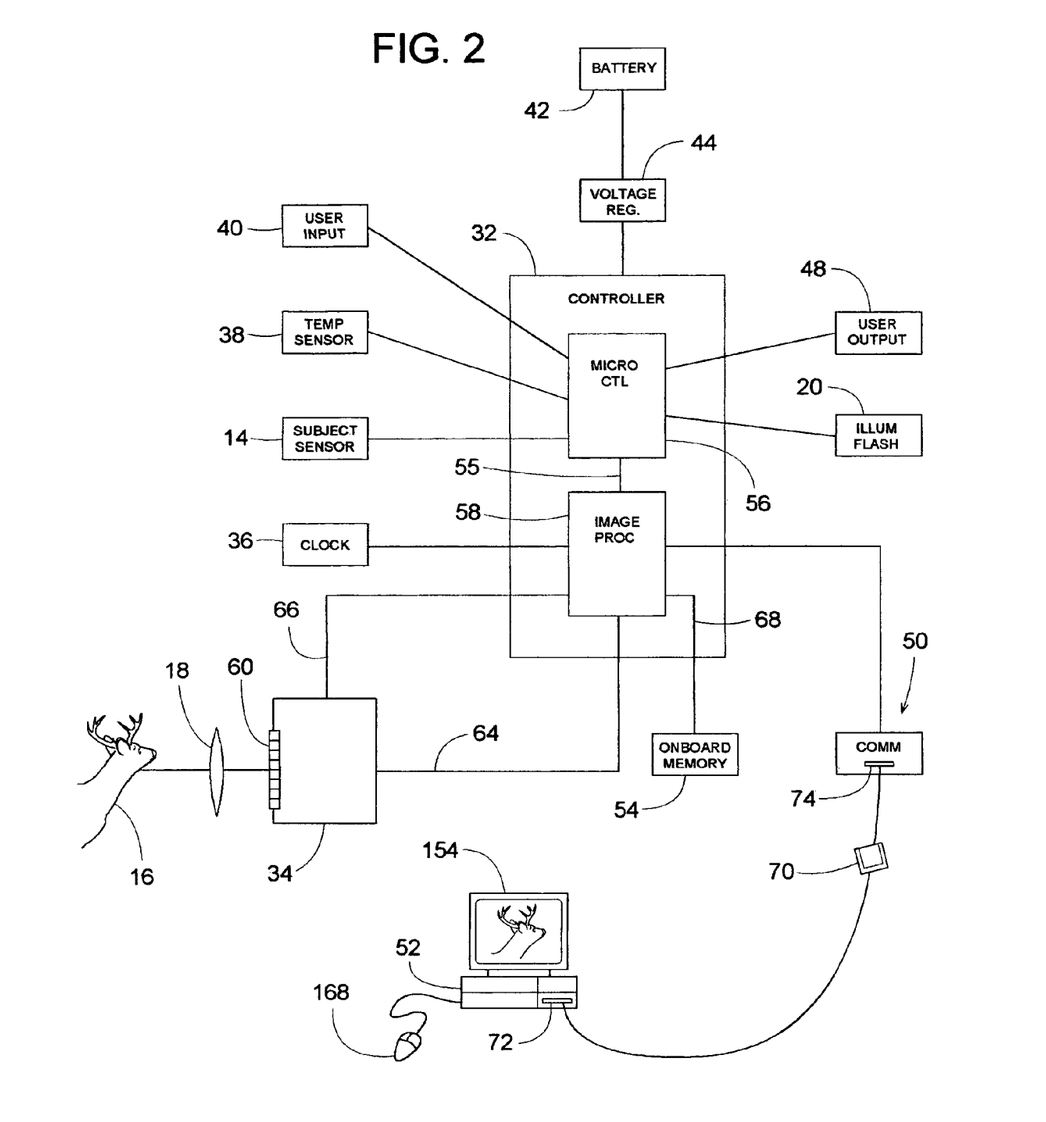
FIG. 2 is a schematic diagram of the digital camera.

Referring to FIG. 2, the camera's electrical circuit may comprise one or more of the following: a controller 32 for various control functions, an image sensor 34 for photoelectrically converting an image of subject 16 to digital data, a clock 36 for various timing functions (including, but not limited, providing controller 32 with real time information), subject sensor 14, a temperature sensor 38 for sensing the ambient temperature, one or more user inputs 40 (e.g., push button, switch, touch pad, etc.) for determining the camera's operation, a battery system 42 (e.g., bank of rechargeable or non-rechargeable batteries) for powering camera 10 outdoors, a voltage regulator 44 for regulating the voltage supplied to various components of camera 10, an internal switch 46 (or external switch) for turning the camera on and off, one or more user outputs 48 (e.g., lights, LED's, liquid crystal display, audio signal, video display, etc.) for indicating various aspects of camera's operation, illuminator 20, a communication system 50 for transferring data between camera 10 and a computer 52 (e.g., desktop computer, laptop computer, hand-held computer, etc.), and an onboard memory 54 for storing data, firmware, digital pictures, camera settings, etc. Onboard memory 54 can be an integral part of controller 32 and/or can be one or more individual memory chips. Examples of memory 54 include, but are not limited to, SRAM, SDRAA, EEPROM, etc.

Figure 3:
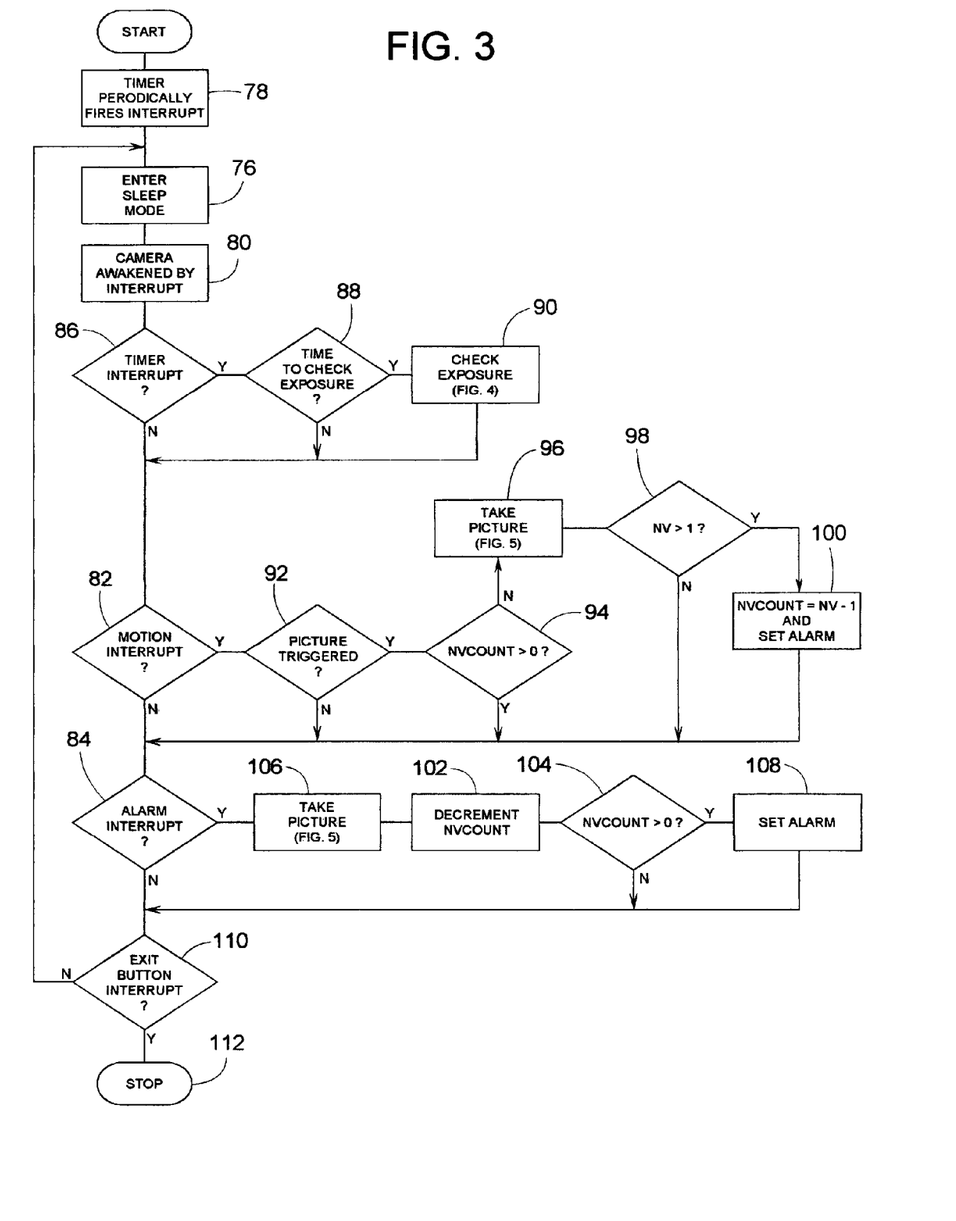
FIG. 3 is a general algorithm of a controller for controlling the camera.
Figure 4:
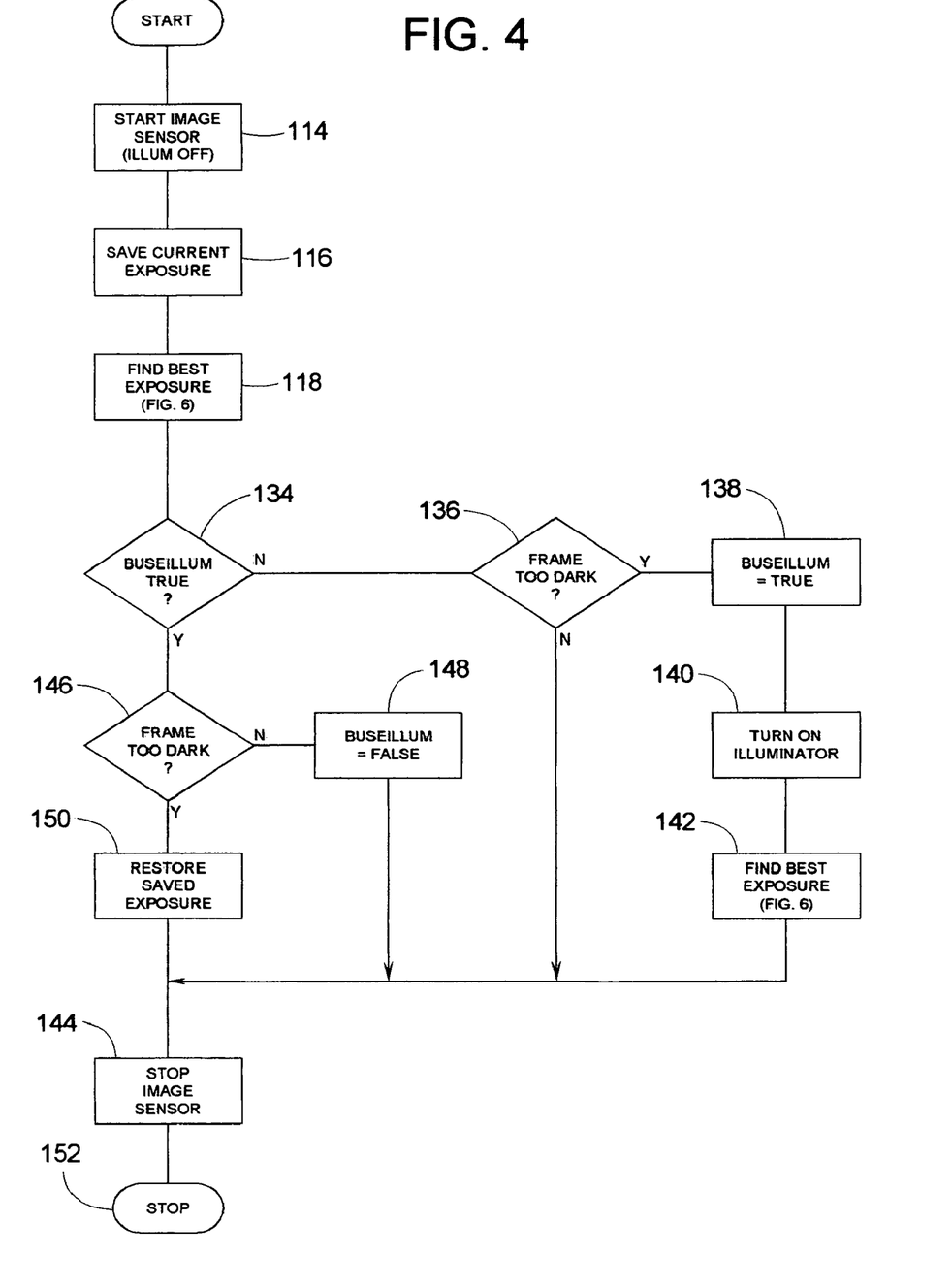
FIG. 4 is an exposure-checking algorithm of the camera's controller.
Figure 5:
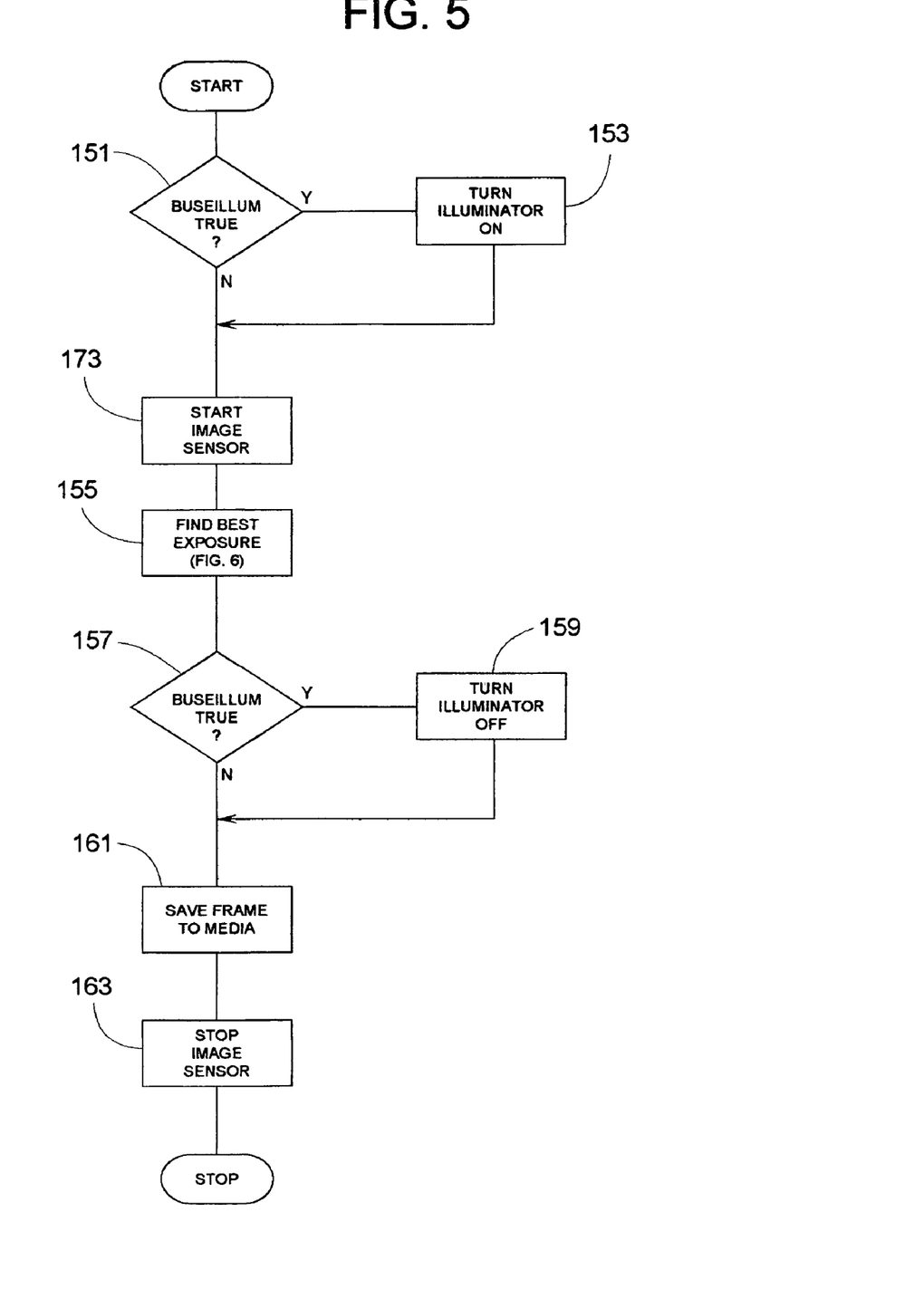
FIG. 5 is a picture-taking algorithm of the camera's controller.

Controller 32 is schematically illustrated to represent any electrical circuit adapted to enable camera 10 to perform one or more of the logical functions illustrated in FIGS. 3, 4 and 5. Controller 10 may be a single control chip with appropriate support circuitry and firmware, or controller 10 may comprise two or more chips with appropriate support circuitry and firmware. In a currently preferred embodiment of the invention, controller 10 comprises an image processor 58 (e.g., a Vicam-III chip by Vista Imaging, Inc. of San Carlos, Calif.) and a microcontroller 56 (e.g., a PIC18F452 chip by Microchip Technology, Inc. of Chandler, Ariz.). Communication between chips 56 and 58 as well as communication with other components of camera 10 may be carried out by any conventional way including, but not limited to, a standard $I^2C$ bus.

Image sensor 34 is schematically illustrated to represent any device that can photoelectrically convert an image of subject 16 to digital data. An example of image sensor 34 includes, but is not limited to, an LM9618 Monochrome CMOS Image Sensor VGA 30 FPS provided by National Semiconductor of Santa Clara, Calif.

Taking a picture involves lens 18 focusing an image of subject 16 onto a light-sensing array 60 of image sensor 34. Image sensor 34 converts the image captured by light-sensing array 60 into a digital raw image representation 64 of the subject's image. The luminance of subject 16 and the value of an exposure setting 66 of image sensor 34 are what generally determine the amplitude of the raw image representation 64. Image processor 58 receives raw image representation 64 and adjusts some of its characteristics, such as its contrast, sharpness and brightness, thereby creating an enhanced image representation 68 that can be stored and later retrieved from onboard memory 54.

Communication system 50 can transfer the enhanced image representation 68 from camera 10 to computer 52. Communication system 50 is schematically illustrated to represent anything that can transfer digital data between a camera and a computer. Examples of communication system 50 include, but are not limited to, a cable, airwaves, light, and a portable memory device 70. A portable memory device is anything that can store data and be manually carried between camera 10 and computer 52 for transferring the data between the two. An example of portable memory device 70 includes, but is not limited to, a Compact Flash card that can plug into an appropriate receptacle, such as receptacle 72 of computer 52 and receptacle 74 of camera 10.

Referring now to the firmware control algorithms of FIGS. 3-6, camera 10 can selectively operate in a normal mode for taking pictures, a sleep mode for conserving energy to prolong the life of battery system 42, and a test mode for periodically adjusting and presetting the camera's exposure setting 66. Adjusting exposure setting 66 may involve adjusting the gain and/or the integration time of image sensor 34.

Camera 10 generally operates in the sleep mode until it is awaken to take a picture or periodically adjust its exposure. The exposure is periodically adjusted and stored so that the camera, upon awakening to take a picture of an animal suddenly running across the camera's view, can almost instantly take the picture using the previously stored exposure setting (or one close to it) rather risk missing the shot by taking excessive time to set the exposure from scratch as the animal passes the camera. Thus, control blocks 80, 86, 88 and 90 periodically awaken the camera to check and adjust its exposure.

In this particular example, a control block 78 periodically fires a timer interrupt about every four seconds. In a control block 76, microcontroller 56 places itself, image processor 58 and/or image sensor 34 in a sleep mode, thereby reducing their power consumption by a factor of at least ten. A block 80 represents a wake-up signal 55 awakening camera 10 by an interrupt, such as the timer interrupt associated with blocks 86 and 88, a motion interrupt (e.g., subject sensor 14) associated with block 82, or an alarm interrupt of block 84. If awakened by the timer interrupt, block 88 references a counter to determine whether it is time to check and adjust exposure setting 66. In a currently preferred embodiment of the invention, block 88 commands controller 32 to update exposure setting 66 about every fifteen minutes. In block 90 (representing camera 10 operating in the test mode) exposure setting 66 is adjusted via the algorithm of FIG. 4, which will be explained later.

If decision block 82 determines that camera 10 is awakened by a motion interrupt from subject sensor 14, then a block 92 determines whether a picture should be taken based on, for example, how many motion interrupts are detected within a certain period. To avoid a glitch or a single erroneous motion interrupt from falsely triggering the camera to take a picture, several motion interrupts occurring within a predetermined period (e.g., one second), for instance, can be used to determine whether an animal is truly present.

If block 92 justifies taking a picture, a block 94 helps determine how many pictures should be taken by referencing a counter referred to as "NVCOUNT," whose initial value is zero. When NVCOUNT is not greater than zero, a block 96 (representing camera 10 being in the picture-taking mode) commands camera 10 to take a picture via the algorithm of FIG. 5, which will be explained later.

Next, a decision block 98, in conjunction with blocks 94, 100, 102 and 104, determines how many sequential or near-video pictures should be taken in response to blocks 92 and 94 determining that at least one picture should be taken. Block 98 references a user-set variable, "NV," that basically specifies a desired number of sequential, near-video pictures. If NV is greater than one, block 100 sets NVCOUNT to NV minus one, and block 100 momentarily sets a flag referred to as, "ALARM," which is automatically reset within a predetermined brief period. Following blocks 82, 92, 94, 96, 98 and 100, control shifts to decision block 84.

If ALARM is set, the operation shifts to a block 106, which commands camera 10 to take a picture via the algorithm of FIG. 5. After taking the picture, block 102 decrements NVCOUNT, and block 104 determines whether NVCOUNT is greater than zero. If so, block 108 sets the ALARM and control shifts to a decision block 110. If NVCOUNT is not greater than zero, control shifts directly to block 110 and ALARM is allowed to expire or reset. Depending on whether controller 32 receives a manual stop or exit interrupt, decision block 110 either stops the operation via block 112 or returns control to block 76, which puts camera 10 back in the sleep mode, and the process continues from there.

Figure 6:
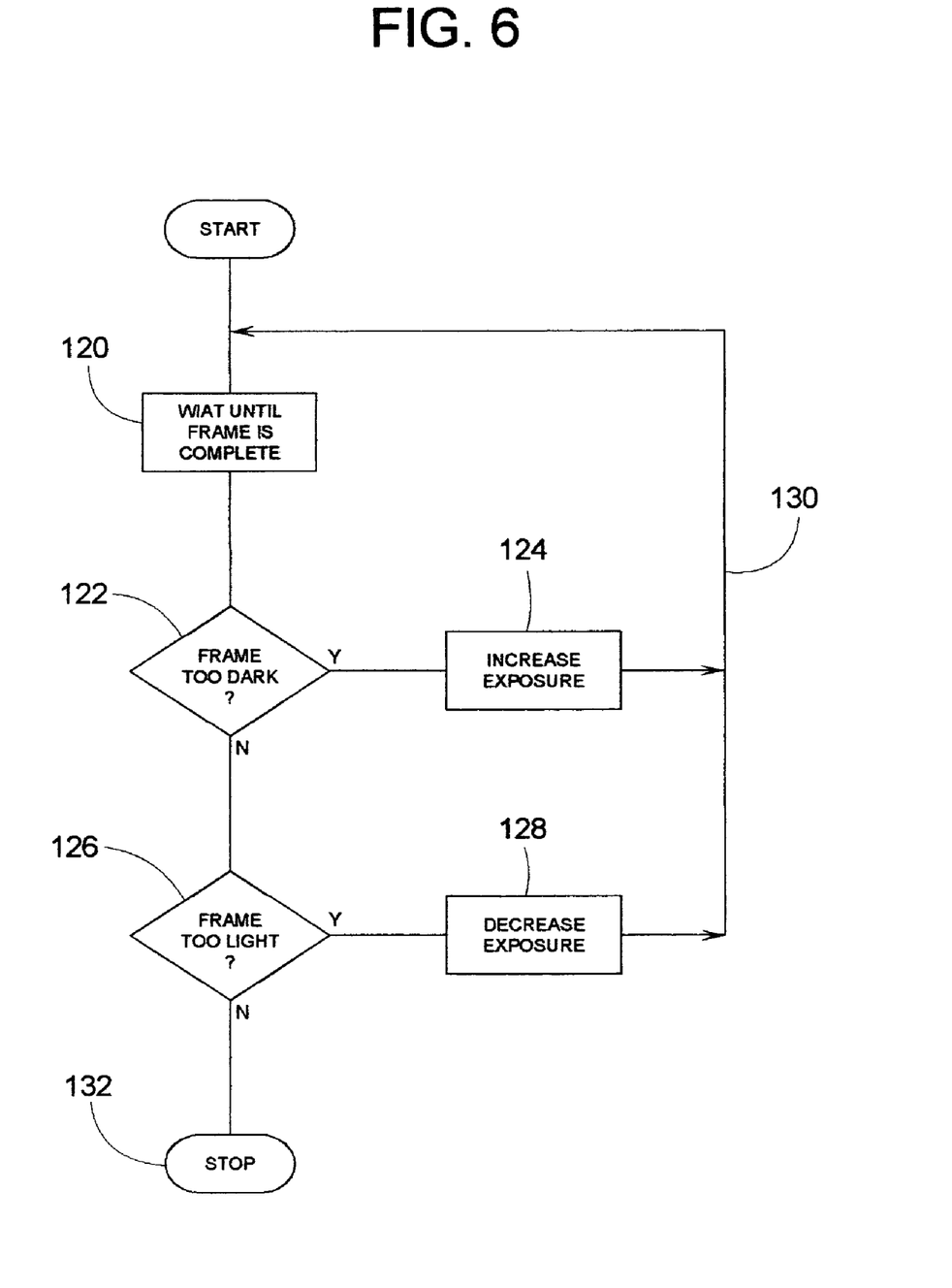
FIG. 6 is an exposure-adjusting algorithm of the camera's controller.

As mentioned earlier, exposure setting 66 is checked according to the algorithm of FIG. 4 and adjusted according to the algorithm of FIG. 6. Referring to block 114 of FIG. 4, image sensor 34 is activated while illuminator 20 turned off. A block 116 saves the current exposure setting 66, and a block 118 references the algorithm of FIG. 6 to improve or adjust setting 66.

To adjust exposure setting 66, image sensor 34 scans an image to create what is referred to as a frame, as indicated by a block 120 of FIG. 6. Controller 32 (e.g., image processor 58) examines the resulting raw image representation 64 and cooperates with image sensor 34 to adjust exposure setting 66 per blocks 122, 124, 126 and 128. A loop 130 provides an iterative process where setting 66 is repeatedly adjusted until the frame is neither too light nor too dark as determined by blocks 126 and 122 respectively. Once an acceptable exposure setting 66 is achieved, a stop block 132 returns the camera's operation to a block 134 of the algorithm of FIG. 4.

In block 134 of FIG. 4, controller 32 determines whether illuminator 20 is currently needed by referencing a variable labeled, "BUSEILLUM," which can have a value of "true" (meaning use illuminator 20) or "false" (do not use illuminator 20). If BUSEILLUM is false and the most recently scanned image or frame is too dark, decision block 136 enables control block 138 to change BUSEILLUM to true and block 140 turns illuminator 20 on. Block 142 then transfer control back to the algorithm of FIG. 6 to adjust exposure setting 66. After adjusting exposure setting 66, the control returns to the algorithm of FIG. 4 where a block 144 stops image sensor 34.

If BUSEILLUM is false at block 134, and the frame is not too dark as determined by block 136, then the operation goes directly from block 136 to block 144, bypassing blocks 138, 140, and 142.

If BUSEILLUM is true at block 134, and the frame is not too dark as determined by block 146, then block 148 makes BUSEILLUM false, and control shifts to block 144.

If BUSEILLUM is true at block 134, and the frame is too dark at block 146, then block 150 restores the saved exposure setting 66, and block 144 stops image sensor 34. Block 152 completes the test mode where the camera checks and adjusts its exposure.

To take a picture, blocks 96 or 106 of FIG. 3 direct the controller to the algorithm of FIG. 5. Here, block 151 determines whether BUSEILLUM is true or false. If true, block 153 turns illuminator 20 on and block 173 starts image sensor 34. If false, block 173 starts the image sensor without illuminator 20. Then, block 155 finds the best exposure via the algorithm of FIG. 6. The iterative process of finding the best exposure is rather quick, as exposure setting 66 has already been periodically checked and adjusted, so only slight adjustment, if any, may be needed. Once exposure setting 66 is adjusted, control block 157 of FIG. 5 determines whether BUSEILLUM is true or false. If true, block 159 turns illuminator 20 back off and block 161 saves the latest frame as a picture. In other words, image processor 58 adjusts raw image representation 64 to create enhanced image representation 68, which is then stored on onboard memory 54 and may eventually be stored on portable memory device 70. If BUSEILLUM is false at block 157, then illuminator 20 is already off, so the operation of block 159 can be skipped. Finally, in block 163, image sensor 34 is stopped, which completes the picture-taking mode of operation.

A digital wildlife camera automatically triggered by the presence of an animal or some other subject, can in time generate a tremendous number of pictures. Managing all those pictures (organizing, sorting, and retrieving them) can be a daunting task. Thus, camera 10 is most valuable when used in conjunction with a picture managing software program. A software program loaded on computer 52, for instance, can provide a computer monitor 154 (any display generated by a computer) with a display similar to that shown in FIG. 7.

Figure 7:
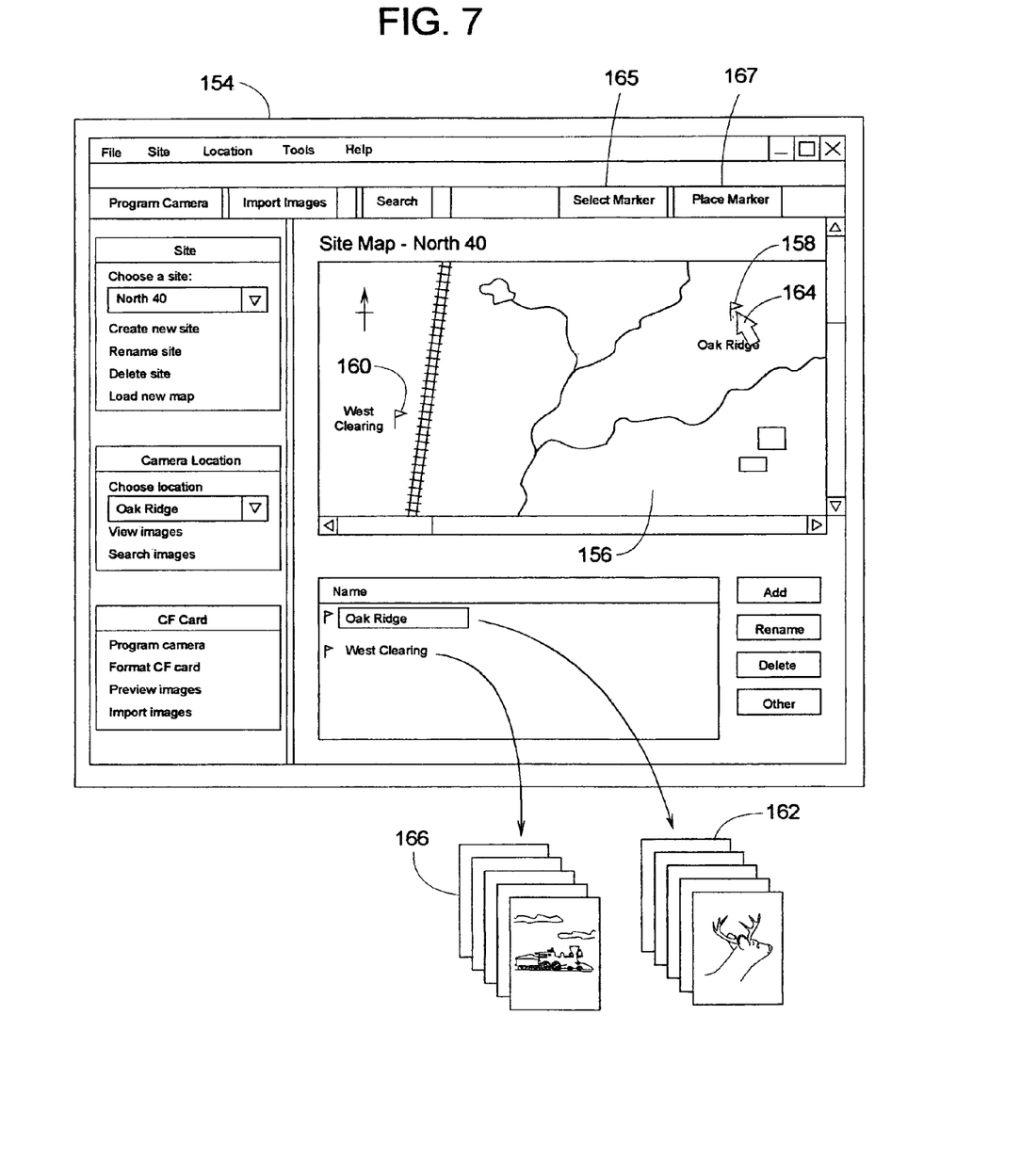
FIG. 7 is a first view that can be generated by a computer for managing a plurality of pictures.

In this example, a geographical map 156 is one of a plurality of user-selectable image files stored on computer 52 that can be displayed on monitor 154. The user-selectable image file, such as map 156, includes a plurality of relevant regions upon which a number of reference markers can be placed. A first marker 158, for example, can be placed on map 156 in the region designated as, "Oak Ridge," and a second marker 160 can be placed in the region identified as, "West Clearing." A first set of pictures 162 taken in the Oak Ridge area can be stored in association with first marker 158, such that mouse-clicking 164 or otherwise selecting first marker 158 retrieves pictures 162 for viewing on computer monitor 154. The term, "mouse-clicking" broadly represents any point-and-select method. Examples of mouse-clicking include, but are not limited to using a computer mouse 168 and its buttons, using a touch pad of a laptop computer, etc. A second set of pictures 166 taken in near the West Clearing can be stored in association with second marker 160, such that mouse-clicking or otherwise selecting second marker 160 retrieves pictures 166 for viewing on computer monitor 154. The placement of markers 158 and 160 on particular regions of map 156 can be accomplished using soft buttons 165 and 167 and using computer mouse 168 with a conventional click-and-drag method.

Figure 8:
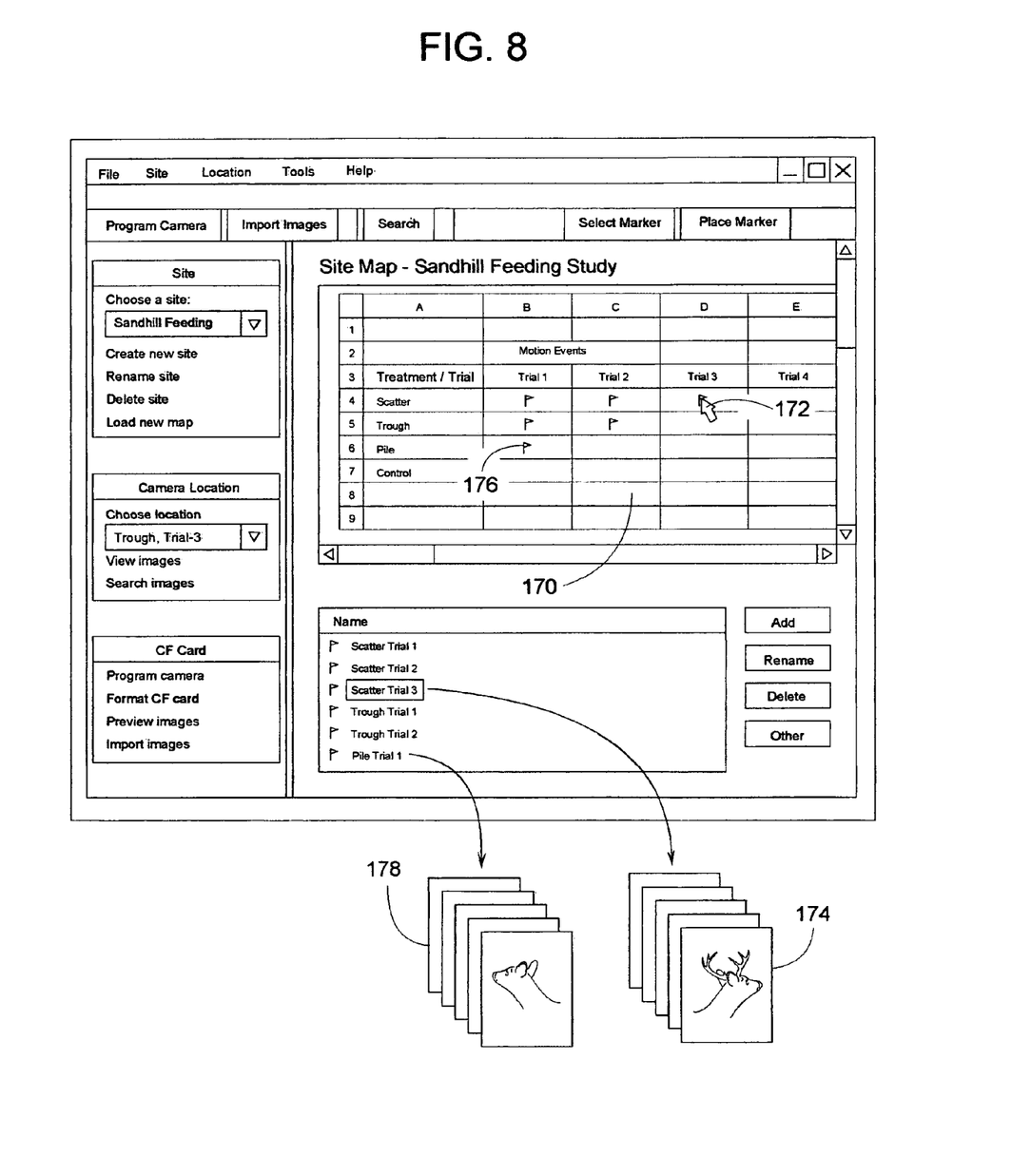
FIG. 8 is a second view that can be generated by a computer for managing a plurality of pictures.

In a similar example, shown in FIG. 8, a nonworking image of a table 170 or spreadsheet is the user-selectable image that is displayed rather than map 156. It should be noted that table 170 is just an image and not a working spreadsheet. A conventional "Alt-Print Screen" function of a computer keyboard can be used to "cut-and-paste" or create such a nonworking image of a working spreadsheet. In this case, the markers are placed in regions that appear as spreadsheet cells such that mouse-clicking 172 on a marked cell leads the user to a set of pictures that pertain to that cell. A first set of pictures 174, for example, pertains to Scattered Feeding in Trial-3. Selecting a second marker 176 brings up a second set of pictures 178 that pertains to Pile Feeding in Trial-1.

Figure 9:
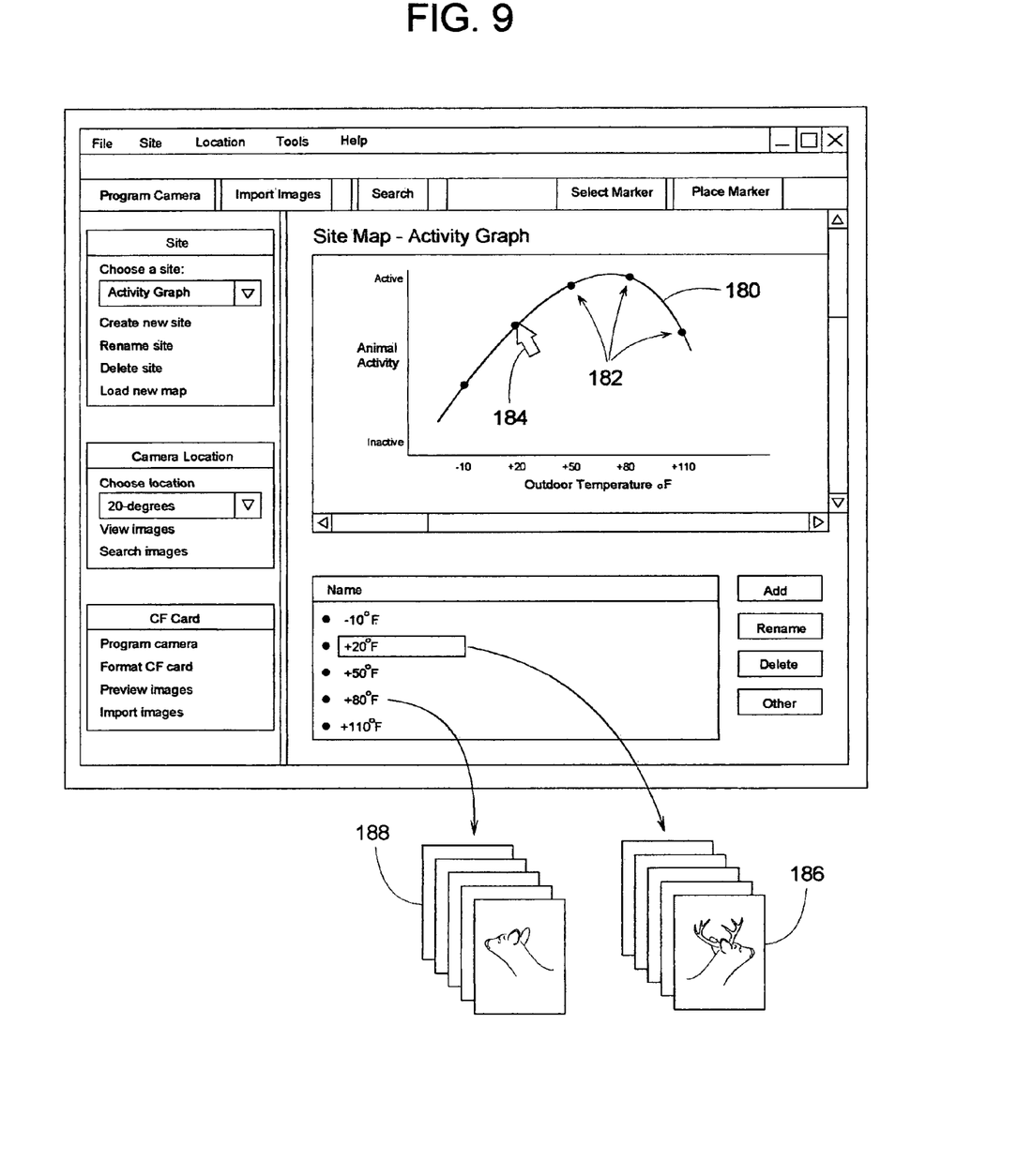
FIG. 9 is a third view that can be generated by a computer for managing a plurality of pictures.

In another example, shown in FIG. 9, a nonworking image of a graph 180 or chart is the user-selectable image that is displayed rather than map 156 or table 170. In this case, reference markers 182 are points on graph 180. Mouse-clicking 184 on a point leads the user to a set of pictures that pertain to that point. A first set of pictures 186, for example, pertains to the 20-degree point. Selecting the point at 80-degrees brings up a second set of pictures 188 taken at that temperature.

Figure 10:
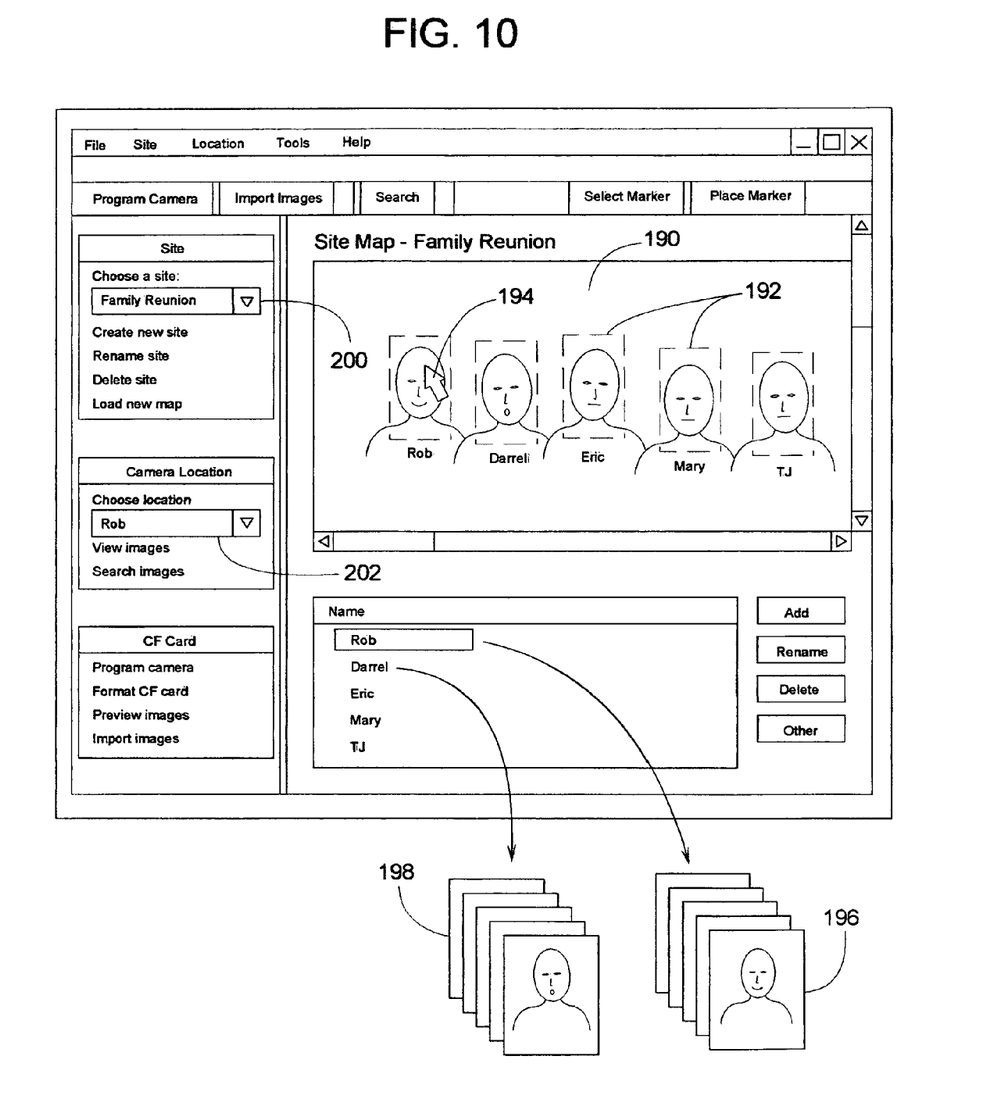
FIG. 10 is a fourth view that can be generated by a computer for managing a plurality of pictures.

Yet another example, shown in FIG. 10, the user-selected image is a photograph 190 of several people at a family reunion. In this case, the plurality of relevant regions are the various individuals, and the rectangular reference markers 192 overlay the individuals, but the markers are invisible. Mouse-clicking on an individual selects the invisible marker that overlays that individual, which brings up a set of pictures of that individual. Mouse-clicking 194 on "Rob," for example, brings up a set of pictures 196 of Rob, and mouse-clicking on "Darrel" would lead to a set of pictures 198 of Darrel.

When the software program is set up to include several user-selectable "Site Map" images, such as "North 40" of FIG. 7, "Sandhill Feeding" of FIG. 8, "Activity Graph" of FIG. 9, and "Family Reunion" of FIG. 10, a drop-down menu 200 can be used for selecting a desired Site Map image on which various reference markers can be placed. Also, once a Site Map image is displayed, another drop-down menu 202, can be used to select a particular set of pictures, whereby drop-down menu 202 is an alternative to mouse-clicking on the various reference markers.

Portable memory device 70 not only conveys digital pictures from camera 10 to computer 52, but it also conveys user-adjustable parameters from computer 52 to camera 10, wherein the user-adjustable parameters help determine picture characteristics such as sharpness, contrast, and brightness.

Although the invention is described with reference to a preferred embodiment, it should be appreciated by those of ordinary skill in the art that various modifications are well within the scope of the invention. Therefore, the scope of the invention is to be determined by reference to the following claims.

The invention claimed is:

1. A method of operating a digital camera selectively in a picture-taking mode for taking pictures of a subject, a sleep mode for conserving energy, and a test mode for presetting an exposure setting, the method comprising:

appreciably reducing power consumption of the digital camera by switching to the sleep mode;

periodically updating the exposure setting to a preliminary exposure setting by periodically switching from the sleep mode to the test mode in response to a clock signal, wherein the preliminary exposure setting is at least partially based on an amount of light sensed by the digital camera during the test mode;

switching from the sleep mode to the picture-taking mode in response to the digital camera detecting that the subject is present;

while in the picture-taking mode, taking a first picture of the subject with the exposure setting at the preliminary exposure setting if the preliminary exposure setting is at a predetermined appropriate value for the first picture;

while in the picture-taking mode, adjusting the exposure setting to a more appropriate exposure setting if the preliminary exposure setting is decidedly inappropriate for the first picture; and taking a second picture of the subject with the exposure setting at the more appropriate exposure setting if the preliminary exposure setting is decidedly inappropriate value for the first picture.

2. A camera for creating a digital picture of a subject so that the digital picture can be displayed on a computer, the camera comprising:

a weather-resistant case that can be opened for accessing an interior of the weather-resistant case;

a digital image sensor disposed within the interior of the weather-resistant case for creating a raw image representation of an image of the subject;

a lens for focusing the image onto a light sensing device;

an exposure setting associated with the digital image sensor, wherein the exposure setting helps determine the raw image representation;

a clock system that provides a clock signal;

a subject detector that provides a trip signal in response to detecting that the subject is present;

an illuminator for illuminating the subject;

a controller operatively coupled to the clock system and the subject detector so as to be responsive to the clock signal and the trip signal, the controller is disposed within the interior of the weather-resistant case and is connected to receive the raw image representation from the digital image sensor and create an enhanced image representation of the image based on the raw image representation received from the digital image sensor, the controller is selectively operable in a sleep mode, a test mode, and a picture-taking mode, wherein the controller in the picture-taking mode can cooperate with the digital image sensor to adjust the exposure setting and can trigger the illuminator to illuminate the subject, and the controller in the test mode can cooperate with the digital image sensor to adjust the exposure setting and can trigger the illuminator to illuminate the subject, and the sleep mode forces at least one of the controller and the digital image sensor to function at an appreciably reduced level of power consumption so as to conserve energy as the camera has an electrical power consumption that is at least ten times greater in the picture-taking mode than in the sleep mode;

a user input operatively coupled to the controller for determining an operating status of the camera;

a user output operatively coupled to the controller for providing an indication of the operating status of the camera;

an onboard memory operatively coupled to the controller for storing the enhanced image representation;

a battery system for powering the digital image sensor, the controller, the onboard memory, and the illuminator; and a firmware program associated with the controller such that the controller in conjunction with the firmware program creates the enhanced image representation by adjusting a plurality of characteristics of the raw image representation, wherein the plurality of characteristics includes at least one of sharpness, contrast, and brightness, the firmware program also determines when the controller selectively switches to the sleep mode, the test mode, and the picture-taking mode, such that:

a. the controller periodically switches from the sleep mode to the test mode in response to the clock signal, wherein the controller periodically works in conjunction with the digital image sensor to adjust the exposure setting to a preliminary value;

b. the controller switches from the sleep mode to the picture-taking mode in response to the trip signal, wherein the controller receives a first raw image representation created by the digital image sensor, wherein the first raw image representation is based on the exposure setting being at the preliminary value, which was set during the test mode that occurred before the picture-taking mode; and c. the controller switches from the test mode to the sleep mode after the controller and the digital image sensor set the exposure setting at the preliminary value.

3. The camera of claim 2, wherein the exposure setting is adjusted to the preliminary value by a strategic iterative method, wherein the strategic iterative method involves creating a plurality of raw image representations under a plurality of different exposure settings until the digital image sensor creates a properly exposed raw image representation, whereby the preliminary value is stored for later use.

4. The camera of claim 2, wherein controller while operating in the picture-taking mode changes the exposure setting from the preliminary value to a more recent value upon evaluating the first raw image representation, whereby the more recent value is used for creating a second raw image representation.

5. The camera of claim 2, wherein the camera is operable during a daytime period that begins at dawn and a nighttime period that begins at dusk, wherein the daytime period and the nighttime period can be distinguished by a predetermined amount of available light, wherein the controller switches to the test mode a plurality of times during the nighttime period during which the controller activates the illuminator more often near dusk than near dawn.

6. The camera of claim 2, wherein the controller comprises a microcontroller chip and an image processor chip, wherein the image processor chip consumes more power than does the microcontroller chip when the controller is in the picture-taking mode, and the microcontroller chip provides the image processor chip with a wakeup signal that switches the image processor chip from the sleep mode to the picture-taking mode.

* * * * *